March 14, 1967 W. J. SCHRENK 3,308,508

DIE

Filed Oct. 2, 1964 2 Sheets-Sheet 1

INVENTOR.
Walter J. Schrenk
BY
ATTORNEY

March 14, 1967 W. J. SCHRENK 3,308,508
DIE
Filed Oct. 2, 1964 2 Sheets-Sheet 2

INVENTOR.
Walter J. Schrenk
BY
ATTORNEY

United States Patent Office 3,308,508
Patented Mar. 14, 1967

3,308,508
DIE
Walter J. Schrenk, Bay City, Mich., assignor to The Dow Chemical Company, Midland, Mich., a corporation of Delaware
Filed Oct. 2, 1964, Ser. No. 401,093
6 Claims. (Cl. 18—14)

This invention relates to an improved die, and, more particularly, relates to a die for the preparation of multi-layer tubes from thermoplastic resinous material.

Frequently, it is desired to extrude multi-layer tubes of thermoplastic resinous film. Oftentimes, such tubes are simple in nature and contain one or two such layers. However, frequently it is desired to generate tubes from a plurality of layers and be able to vary the number of such layers. Such extrusions frequently require various dies and intricate arrangements of feed ports. Such dies are very expensive and represent a considerable capital investment.

It is an object of this invention to provide an improved die capable of being readily altered to provide tubular film of almost any desired number of layers.

A further object of this invention is to provide an extrusion head capable of providing, by means of a simple adjustment, a tube having from one to many layers or one or a plurality of thermoplastic resinous materials.

Further features and advantages of the present invention will become more apparent from the following specification taken in connection with the drawing wherein.

Figure 5:
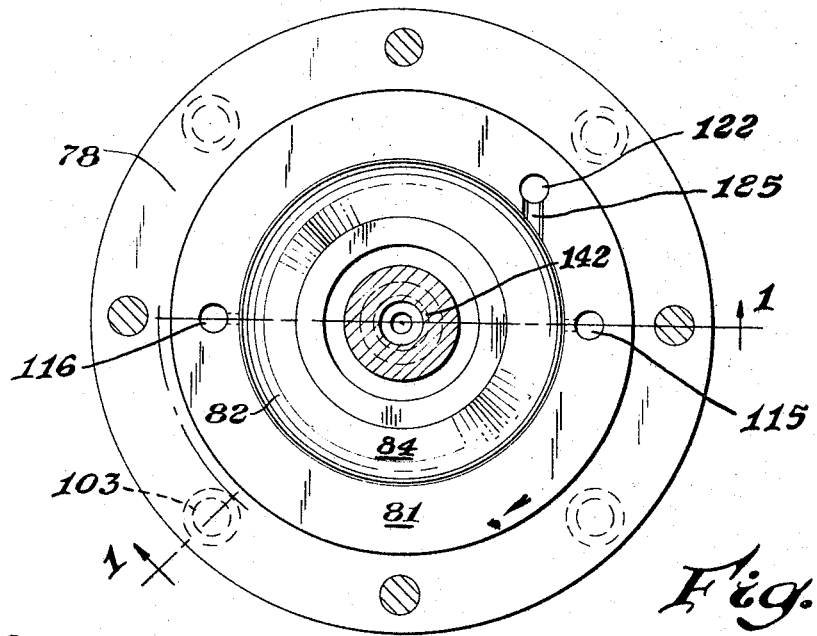
FIGURE 5 is a sectional view of the die of FIGURE 1 taken along the line 5—5.
Figure 1:
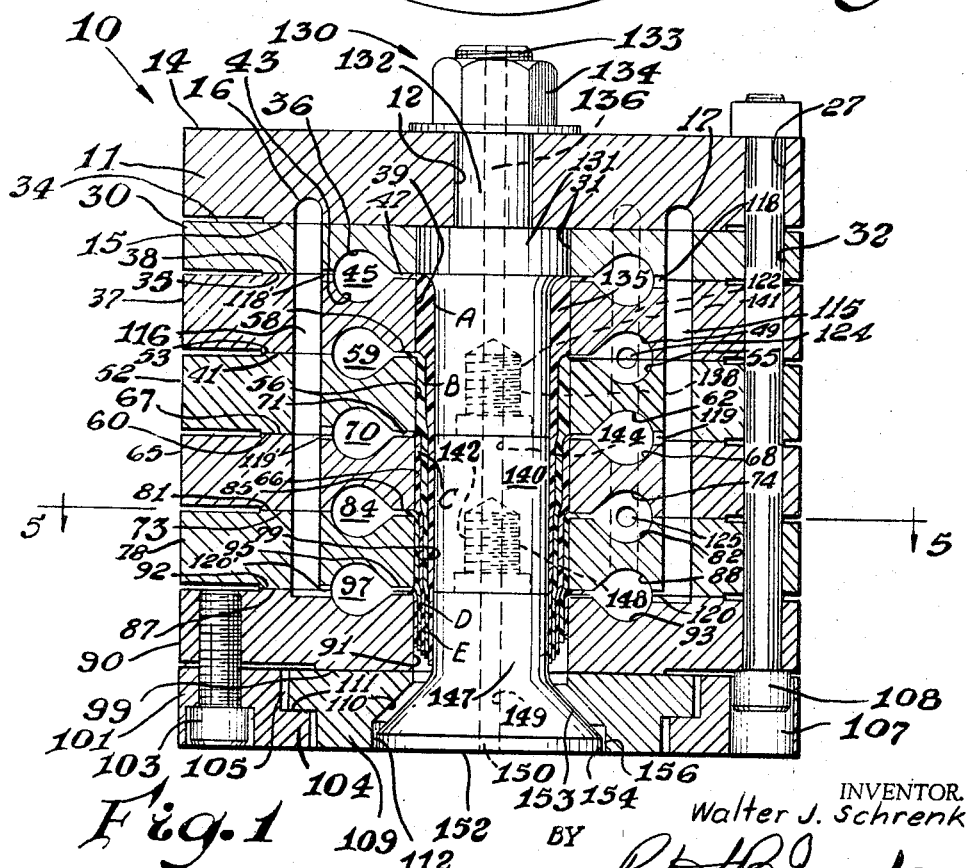
FIGURE 1 is a sectional view of a die in accordance with the invention.
Figure 3:
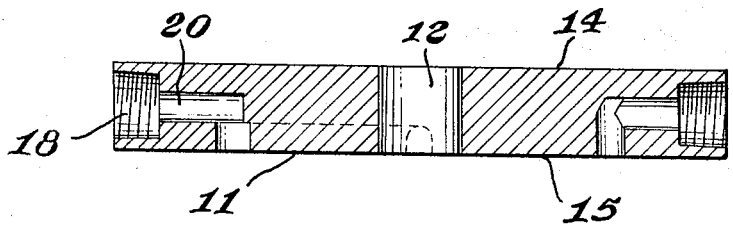
FIGURE 3 is a sectional view of the die body of FIGURE 2 taken along the line 3—3.
Figure 2:
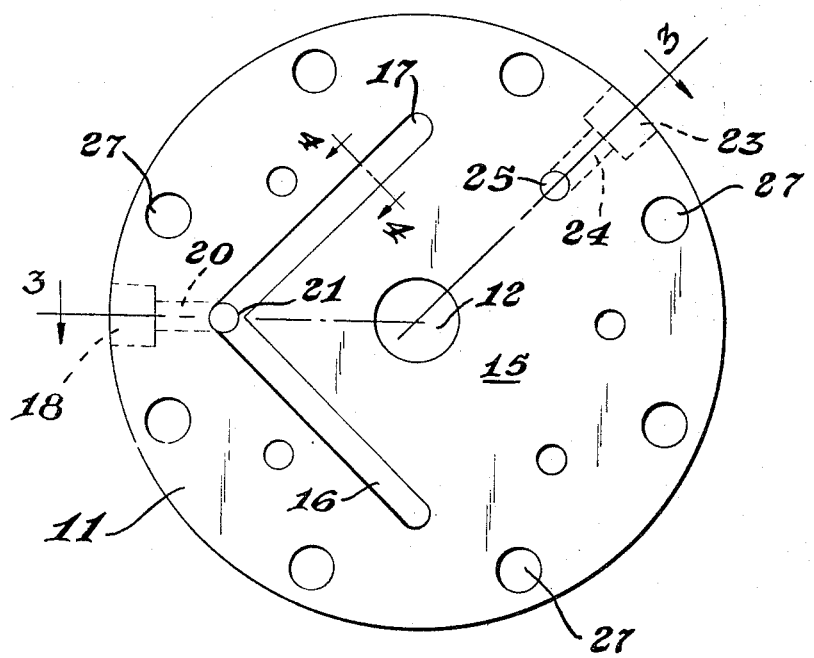
FIGURE 2 is a view of the die body of FIGURE 1 taken along the line 2—2.
Figure 4:
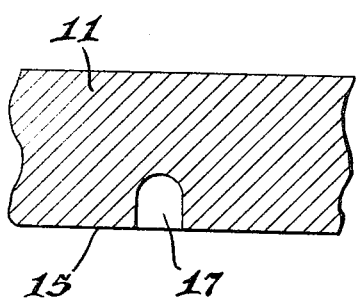
FIGURE 4 is a sectional view of a distribution channel of the die body of FIGURE 2 taken along the line 4—4.

In FIGURE 1 there is illustrated a sectional view of a tubing die in accordance with the present invention, generally designated by the reference numeral 10, the tubing die 10 comprises a die body 11 having defined therein a generally centrally disposed aperture 12. The body 11 has a generally plate-like configuration having a first face 14 and a second face 15. Formed within the body 11 in FIGURE 1 are first polymer discharge grooves 16 and 17. Further detail of the body 11 is illustrated in FIGURES 2, 3, and 4 wherein the die body defines a first polymer inlet 18 in full communication with a first polymer passageway 20. The polymer passageway 20 terminates at the junction of the first polymer distribution grooves 16 and 17 at the location 21. A second polymer entrance 23 is defined within the body 11 and is in communication with the passageway 24, which terminates on the face 15 in the aperture 25. A plurality of bolt holes 27 are peripherally disposed within the die body. In FIGURE 1 adjacent to the die body 11 is a first die plate 30. The die body 30 defines a generally centrally positioned aperture 31 which is coaxial with the aperture 12. A plurality of peripherally disposed apertures 32 are provided in the die plate 30 and adapted to lie in coaxial arrangement wtih the apertures 27 of the die body 11. The first die plate 30 has a first surface 34 in sealing engagement with surface 15 of body 11 and a second surface 35. Within the second surface 35 is disposed an annular recess 36 having a generally semi-circular cross sectional configuration. Adjacent the second surface 35 is disposed a second generally similar die plate 37 having a first surface 38 in sealing engagement with the surface 35 a centrally disposed opening 39 and a second surface 41. A circular recess 43 having a generally semi-circular configuration is formed in the surface 35 generally adjacent the opening 39. The annular recess 36 and the annular recess 43 in cooperative combination form a first plenum 45. The first plenum 45 is in communication with the aperture 39 by means of an annular passageway 47 defined by the portions of the surfaces 35 and 38 generally adjacent the centrally disposed openings 31 and 39. The surface 41 of the second die plate 37 defines an annular recess 49 having a generally semi-circular cross-sectional configuration. A third die plate 52 having a first surface 53 is disposed adjacent to and in sealing engagement with the surface 41 of the second die plate 37. The surface 53 defines a generally annular recess 55 having a generally semi-circular configuration 55. The die plate 52 defines a generally centrally disposed aperture 56. Generally adjacent the aperture 56, the surfaces 41 and 53 define an annular passageway 58 which provides communication between a plenum 59 formed by the recesses 49 and 55 and the apertures 39 and 56. The die plate 52 has a surface 60 remotely disposed from the surface 53. The surface 60 defines a generally annular recess 62 generally adjacent the aperture 56. A fourth die plate 65 is disposed adjacent the third die plate 52. The fourth die plate 65 has a centrally disposed aperture 66 and a first surface 67 in sealing engagement with the surface 60 generally annular cavity 68 is defined within the surface 67. The annular cavities 62 and 68, in cooperative combination, form a plenum 70 and the surfaces 60 and 67 generally adjacent the apertures 56 and 66 define an annular passageway 71. The fourth die plate 65 has a surface 73 generally parallel to and remote from the surface 67. Within the surface 73 is defined a generally annular recess 74 disposed adjacent the opening 66. A fifth die plate 78 is disposed adjacent the fourth die plate 65. The die plate 78 forms a generally centrally disposed aperture 79. The die plate 78 has a first surface 81 in sealing contact with the surface 73 of die plate 65. Within the surface 81 is formed a generally annular recess 82. The recess 74 and the recess 82 form a generally annular plenum 84. The surfaces 81 and 73 define a generally annular passageway 85 providing communication between the plenum 84 and the aperture 79. The die plate 78 has a surface 87 remotely disposed and generally parallel to the surface 81. Within the surface 87 is defined a generally annular recess 88 generally adjacent the opening 79. Adjacent the fifth die plate 78 is a terminal die plate 90. The terminal die plate 90 has a generally centrally disposed aperture 91 and a surface 92 disposed in sealing engagement of the surface 87 of the die plate 78. The surface 92 defines a generally annular recess 93 having a generally semi-circular cross-sectional configuration. The surfaces 87 and 92, in cooperative combination, form a generally annular passageway 95 generally adjacent the openings 79 and 91. The recesses 88 and 93 form a generally annular plenum 97. The terminal die plate 90 has a surface 99 generally parallel to and remotely disposed from the surface 92. A retainer ring 101 is disposed generally adjacent the surface 99 of the terminal die plate 90 and is secured thereto by means of the bolts 103 (one shown). The retainer ring 101 has an internally projecting lip portion 104 defining a generally inwardly facing annular recess 105. The retaining ring 101 has formed therein a plurality of bolt holes 107 adapted to clear the head of a cap screw 108 (only one of such holes is shown). An external die member or plate 109 is disposed in sealing engagement with the surface 99 of the terminal die plate 90 adjacent the aperture 91. The die plate 109 has formed therein a shoulder 110 which is disposed within the recess 105 and adjustably retained by the shoulder 104. The die plate 109 forms an outwardly flaring aperture 111 which terminates remote from the terminal die plate 90 in a die lip 112. The die plates 30, 37, 52, 65 and 78 form internal passageways 115 and 116 which are in communication with the plenums 45, 70 and 97 by means of the passageways 118, 119, 120, 118', 119', and 120' respectively. A third generally longitudinal passageway is formed within the die plates 30, 37, 52 and 65 designated by the reference numeral 122. The passageway 22 is in communication with the plenums 59 and 84 by means of the passageways 124 and 125. The passageways 115 and 116 are in communication with the terminal portions of the recesses 16 and 17 of the die body 11. The passageway 122 is in cooperative communication with the terminal opening 25 of the passageway 25 of the die body 11. A sectional mandrel, generally designated by the reference numeral 130, is disposed within the apertures 12, 31, 39, 56, 66, 79, 91 and 111 of the die plates. The mandrel comprises a base portion 131 having a shank 132 disposed partially within the aperture 12 of the die body 11. A threaded portion 133 receives a nut 134 which serves to retain the base portion 131 in sealing engagement with the surface 15 of the body 11. The base 131 is in sealing engagement with the portion of the first die plate 30 defining the aperture 31. The base member 131 is reduced in diameter as it passes through the apertures 39 and 56 to form a portion of a generally annular passageway 135. The base portion of the mandrel 131 defines an internal passageway 136 providing full communication along the axis of the mandrel. The portion of the base 131, remote from the externally threaded portion 133, defines an internally threaded recess 138. A mandrel extension 140 having a diameter about equal to the portion of the mandrel containing the threaded recess 138 has an externally threaded portion 141 in engagement with the internally threaded portion 138 of the base 131. The generally cylindrical mandrel extension 140 has an internally threaded portion 142 remotely disposed from the externally threaded portion 132 and substantially coaxially aligned therewith. The mandrel extension 140 has an internal passageway 144 adapted to communicate with the internal passage 136 of the mandrel base 131. A mandrel head or die head 147 is disposed adjacent the internally threaded portion 142 of the mandrel extension 140. The mandrel head 147 has an externally threaded portion 148 adapted to engage the internally threaded portion 142 of the mandrel extension 140. The mandrel head 147 defines an internal passageway 149 adapted to communicate with the passageway 144 of the mandrel extension 140. The passageway 149 terminates in an opening 150 in a die face 152 of the die head 147. The mandrel head 147 has a generally frusto conical portion 153 remotely disposed from the threaded portion 148 generally adjacent the frusto conical portion 153 a die lip portion 154. The die lip portion 154, in cooperative combination with the die lip portion 112 of the die plate 110 forms a generally annular extrusion orifice 156. The extrusion orifice 156 is in operative communication with the generally cylindrical annular chamber 135 which is, in turn, in communication with the plenums 45, 59, 70, 84, 97 and the respective polymer supply sources.

In operation of the embodiment of the invention illustrated in FIGURES 1, 2, 3 and 4, a supply of a heat-plastified extrudable material, such as, for instance, thermoplastic resinous materials is placed in operative combination with the polymer inlets 18 and 23. Thermoplastic resinous material flowing into the inlet 18 enters the passageway 20 and passes to the channels or passageways 16 and 17 and subsequently to the passageways 115 and 116 formed in the die plates 30, 37, 52, 65 and 78. The material then flows through the passageways 118 and 118' into the plenums 45, 70 and 97 where it is extruded through the generally annular internally disposed slots 47, 71 and 95 into the annular passageway 135. Extrudable material entering the polymer passageway 23 passes through the passageway 24, out of the orifice 25 and into the generally longitudinally disposed passageway 122 formed within the die plates 30, 37, 52 and 65. Through the passageways 124 and 125 into the plenums 59 and 84, the extrudable material is then discharged from the plenums 59 and 84 through the annular passageways 58 and 85 into the annular passageway 135. The flow rate of the material entering the passageways 18 and 23 is maintained at a level sufficient to maintain streamlined flow within the annular passageway 135 and the material forms layers as indicated in FIGURE 1 and designated by A, B, C, D, and E. The respective layers flow smoothly and evenly through the passageway 135 to the extrusion orifice 156 where they are discharged in the desired layer arrangement. By varying the quantity of material introduced to the passageways 18 and 23, various thickness can be obtained. Thus, the laminar flow provides five layers of material issuing from the die which subsequently, if desired, may be oriented by the trapped bubble process or other convenient means. The passageway formed in the mandrel by the passageways 150, 149, 144 and 136 provides a convenient means for the addition of an inflating fluid. Beneficially, the various die plates are of circular configurtion and are provided with bolt holes or uniformly spaced centers, that is uniform circumferential spacing, which permits the die plates to be arranged in any desired configuration. Thus, 1, 2, 3, 4, 5 or even more different thermoplastic resinous components may be fed to such a die to provide almost any desired arrangements of the components. By adding additional die plates, such as the die plates 37, 65 and 78, and arranging the feed ports, any plenum may be placed in communication with any desired feed passage such as the feed passages 115 and 116. Advantageously, the communication passages, such as passages 118 and 119, are readily formed in a die plate and are readily filled by brazing or silver solder if it is desired to alter the configuration of the die. The feed passages, such as 115 and 116, are readily altered by drilling a suitable hole in the die plate and undesired openings conveniently plugged by the use of metal dowel. Beneficially, in construction of the die, in accordance with the invention, it is frequently advantageous to relieve at least one of the adjacent faces of the die plate to provide a circumferential gap for the insertion of a tool to aid in disassembly. Dies substantially as illustrated in the accompanying drawing are found to be highly successful for preparing multi-layer laminates from thermoplastic resinous materials.

As is apparent from the foregoing specification, the apparatus of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A tubing die consisting essentially of a body portion, a plurality of die plates, each of the die plates defining a generally centrally disposed aperture, each of the die plates being adapted to interfit with one another and be maintained in sealing relationship, the adjacent die plates having generally annular recesses disposed adjacent the central opening, the annular recesses in adjacent die plates defining a generally annular plenum and a generally annular passage extending between the annular plenum and the centrally disposed apertures, a terminal die plate disposed remote from the body portion having defined therein an aperture coaxial with the apertures of the die plates, a fixed mandrel disposed within the apertures of the terminal die plate and the die plates so positioned so as to define an annular extrusion orifice in cooperation with the terminal die plate, the die plates and die body forming a plurality of passageways extending through the die plates and communicating with selected plenums.

2. An extrusion die particularly suited for the extrusion of tubular shaped articles having a plurality of layers of diverse materials, the die comprising a die body, the die body having defined therein a plurality of passageways so constructed and arranged so as to receive an extrudable material and distribute the extrudable material to selected locations on a mounting face of the die body, a plurality of plate-like die plates, each of the die plates defining a generally centrally disposed aperture, a first die plate adapted to engage the mounting face of the die body and having defined therein a plurality of passageways extending through the die plate from a first face to a second face, the first face of the die plate adapted to engage the mounting face of the die body in sealing engagement, the second face of the die plate adapted to engage one of a plurality of die plates defining centrally disposed apertures and passageways corresponding to the passageways in the first die plate and the point of discharge in the die body to provide a communication passage through a mating stack of die plates in sealing engagement, selected die plates having formed therein an annular groove generally adjacent the centrally disposed orifice mating die plates in face-to-face engagement defining a plenum and a generally annular extrusion slot discharging into the centrally disposed orifice, a terminal die plate having a generally centrally disposed opening, the terminal die plate forming a generally circular die lip and being in sealing engagement with the stack of die plates, a mandrel disposed within the central openings of the various die plates and having a terminal end remote from the die body generally corresponding to the configuration of the opening in the terminal die plate and defining an annular extrusion orifice.

3. The apparatus of claim 2 wherein the mandrel defines a passageway terminating at the terminal end of the mandrel within the area encompassed by the annular extrusion orifice on the terminal end and providing communication between a location on the die body remote from the mounting face and the terminal end of the mandrel.

4. The apparatus of claim 2 wherein the mandrel comprises a plurality of generally cylindrical bodies secured together to form a rigid member.

5. The apparatus of claim 2 wherein the die body and die plates have a generally circular configuration.

6. The apparatus of claim 5 wherein the die plates including the terminal die plate have formed therein a plurality of bolt or mounting holes having equal annular spacing.

References Cited by the Examiner

UNITED STATES PATENTS

| | | | |
|---|---|---|---|
| 2,443,053 | 6/1948 | Parmelee | 18—14 X |
| 2,747,223 | 5/1956 | Cady. | |
| 2,820,249 | 1/1958 | Colombo | 18—13 |
| 3,102,303 | 9/1963 | Lainson | 18—14 |

FOREIGN PATENTS

| | | |
|---|---|---|
| 520,637 | 6/1953 | Belgium. |
| 537,801 | 3/1957 | Canada. |
| 1,082,043 | 5/1960 | Germany. |

WILLIAM J. STEPHENSON, *Primary Examiner.*